(12) United States Patent
Milani et al.

(10) Patent No.: US 7,033,632 B2
(45) Date of Patent: Apr. 25, 2006

(54) CASTING FOOD PRODUCTS TO CONTROLLED DIMENSIONS

(75) Inventors: Franco Milani, Green Bay, WI (US); Shawn Owens, Joplin, MO (US)

(73) Assignee: Schreiber Foods, Inc., Greenbay, WI (US)

( * ) Notice: Subject to any disclaimer, the term of this patent is extended or adjusted under 35 U.S.C. 154(b) by 448 days.

(21) Appl. No.: 10/140,775

(22) Filed: May 6, 2002

(65) Prior Publication Data

US 2003/0207012 A1   Nov. 6, 2003

(51) Int. Cl.
A23C 19/00   (2006.01)

(52) U.S. Cl. .................. 426/515; 426/517; 426/524; 426/576; 426/582; 99/455; 425/224; 62/66; 62/345; 62/346

(58) Field of Classification Search ........... 426/512, 426/515, 517, 518, 582, 524, 576; 99/455, 99/464, 466; 425/224; 62/66, 340, 345–346
See application file for complete search history.

(56) References Cited

U.S. PATENT DOCUMENTS

| 2,907,109 | A | | 10/1959 | Palmer |
| 3,887,719 | A | | 6/1975 | Miller |
| 4,217,818 | A | | 8/1980 | Hazen |
| 4,790,242 | A | | 12/1988 | Driessen |
| D306,959 | S | | 4/1990 | Driessen |
| 5,527,551 | A | | 6/1996 | Fager et al. |
| 5,573,805 | A | * | 11/1996 | Fager et al. ............ 426/515 |

FOREIGN PATENT DOCUMENTS

| WO | WO 97/01287 | * | 1/1997 |
| WO | WO 97/06906 | * | 2/1997 |

OTHER PUBLICATIONS

Adverstisement Pamphet, GBM M-100 Casting Line, published by Green Bay Machinery, Green Bay, Wisconsin, Sep./Oct. 1989.

* cited by examiner

*Primary Examiner*—Drew Becker
(74) *Attorney, Agent, or Firm*—Brinks Hofer Gilson & Lione

(57) ABSTRACT

A device and process for adjustably controlling the dimensions of an extruded food product cast into a sheet using, for example, a pressure manifold mounted on a casting belt, or a chill roll/gauge roller combination.

20 Claims, 1 Drawing Sheet

CASTING FOOD PRODUCTS TO CONTROLLED DIMENSIONS

BACKGROUND OF THE INVENTION

The invention generally relates an apparatus and process for continuously casting food products. More specifically, the invention relates to such an improved apparatus and process employing side rails for controlling the dimensional characteristics of the cast food product.

Food products such as processed cheese maybe difficult to cut or slice because, for example, the cheese tends to cling to the cutting surfaces. For this or other reasons, it may be preferable to form a molten food product into thin sheets by an extrusion or casting process. A cheese casting machine shown in FIG. 1, for example, uses a cooling belt, such as a stainless steel belt B, driven by large drums D. Pans may be installed at the undersides of the belts to flood the insides of the belt with a cooling medium such as a refrigerated glycol solution.

Still referring to FIG. 1, a pressurized discharge manifold may be used for distributing the molten food product onto the cooling belt and for forming the food product into a sheet having a controlled thickness. A conventional pressure manifold is a closed cavity typically consisting of a two-piece chamber. Conventionally, a positive displacement pump distributes the food product to the pressurized closed cavity of the manifold. The closed cavity receives the hot food product under pressure and distributes it uniformly along the full length of the manifold, which is oriented perpendicular to the length of the casting belt. Pressure manifolds useable in the present invention are disclosed in U.S. Pat. Nos. 4,790,242 and 5,527,551, incorporated herein by reference. The pressure manifold may be mounted at the infeed end of the machine on top of the belts ("top-cast") or, alternatively, at some position around the radius of the upper drum at the infeed end ("angle-cast").

Alternatively, a gauge roller on a chill roll may be used to provide a cast food product in sheet form.

The thin, cooled sheets may be slit into narrow strips or ribbons. The strips may then be stacked and cut to length for packaging, such as in slice or other forms.

To satisfy commercial requirements, food product deposition onto the cooling belt must be accomplished rapidly and on a continuous basis to accommodate the high rate at which the product is discharged on the casting belt.

Whether casting a food product using a pressure manifold or a chill roll, it would be advantageous to adjustably control the dimensions of the cast food product in a predetermined manner. This may be particularly advantageous when attempting to extrude products have a relatively low viscosity, such as a gelatin-based product as disclosed in the patent application Ser. No. 10/140,772 titled "Product And Process For Delivering Flavoring Agents To Food Products," incorporated herein by reference, filed on the same day as this application and assigned to the same assignee as here.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Casting belt" means a conveyor belt or other means, which may be chilled or cooled, suitable for supporting a cast food product.

SUMMARY OF THE INVENTION

The objects mentioned above, as well as other objects, are solved by the present invention, which overcomes disadvantages of prior art continuous casting devices and methods, while providing new advantages not believed associated with such devices and methods.

In one preferred embodiment, a casting apparatus is provided for extruding and casting a food product into a sheet having predetermined dimensions. The food product is deposited in molten form and a device, such as a top-cast or angle-cast pressure manifold, or chill and gauge rolls, is used to distribute the food product along the support surface and to form it into a sheet. A mechanism is provided to control the dimensions of the sheet of the food product. In a preferred embodiment, the mechanism includes opposing side rails adjacent at least a portion of a longitudinal periphery of the support surface.

Preferably, the distance between the opposing side rails may be adjusted. It is preferable that the angle between one or both of the side rails and the plane of the support surface is adjustable.

Using the present invention, various food products such a processed cheese may be cast to controlled dimensions, although the invention is believed particularly advantageous for fluidic products of low viscosity such as gelatin-based products.

A process for casting a food product into a sheet having controlled dimensions also forms part of the present invention. A moving support surface, such as a casting belt or chill roll is provided. A food product is deposited in molten form onto the support surface. Using a pressure manifold or chill and gauge rolls, for example, the food product is distributed over the support surface and formed into a sheet. The dimensions of the sheet are controlled using opposing side rails adjacent at least a portion of a longitudinal periphery of the support surface. The distance between the opposing side rails, as well as the angle one or both of the side rails makes with the plane of the support surface, is preferably adjustable.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENTS

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Figure 1:
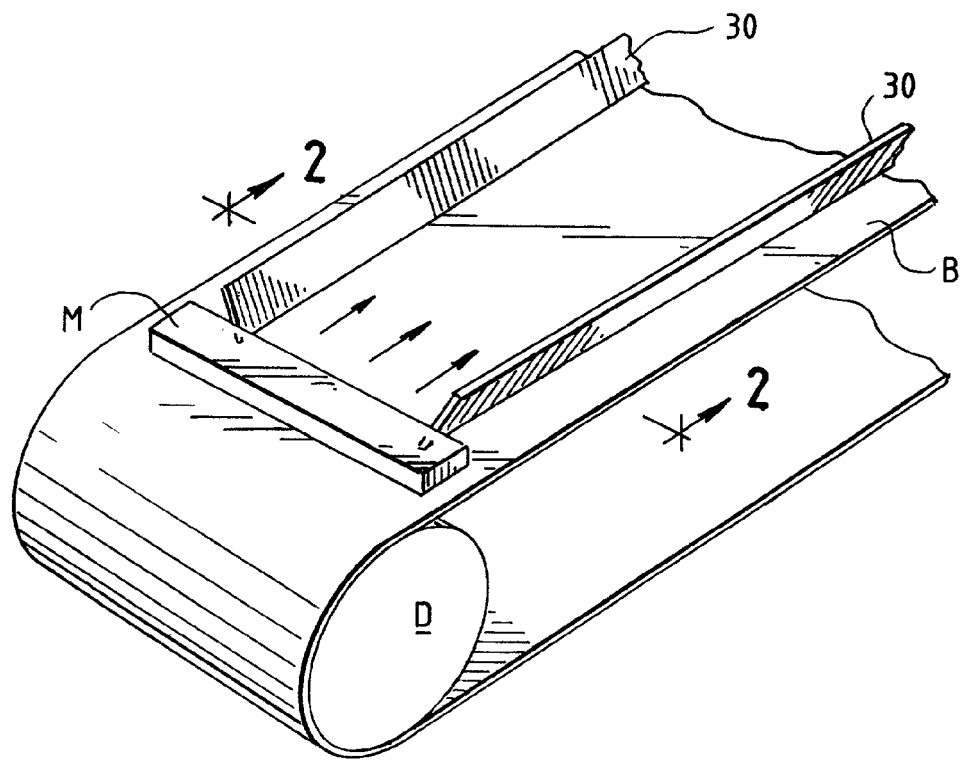
FIG. 1 is a perspective view of a cheese casting machine using a pressure manifold and the side rails of the present invention.

A food product to be cast, such as all types of processed cheese, gelatin-based food products such as spiced gelatins, or other food products, may be delivered, e.g., by a pump, to the upstream edge of a conventional pressure manifold, such as pressure manifold 10 shown in FIG. 1. As the casting belt moves, the product is pulled under the pressure manifold, casting the product in a thin sheet to a known thickness and width. Vertical plates inside the manifold may be adjusted to determine the width of the extruded sheet.

Upon extrusion, a low viscosity food product such as the spiced gelatin, described above, may be so fluid that it will not retain the dimensional characteristics at which it was extruded. A cooling solution may be applied to the bottom of the casting belt as it travels downstream of the manifold, cooling the extruded product. Despite the cooling, if the fluid-like product is allowed to freely flow, the extruded width of the product may increase, and thus the sheet thickness may decrease, resulting in an inconsistent thickness across the width of the extrusion. In some cases, the fluid-like product may travel 4–6 feet before it is cooled enough to begin retaining its geometrical shape.

Referring to FIG. 1, to solve this problem and prevent the product from losing its extruded dimensional characteristics, side rails 30 are located downstream of pressure manifold 10, on each side of the extruded sheet of food product. Side rails 30 contact the casting belt and act as a boundary for the fluid-like product until it is cooled enough to retain its dimensional characteristics.

Figure 2:
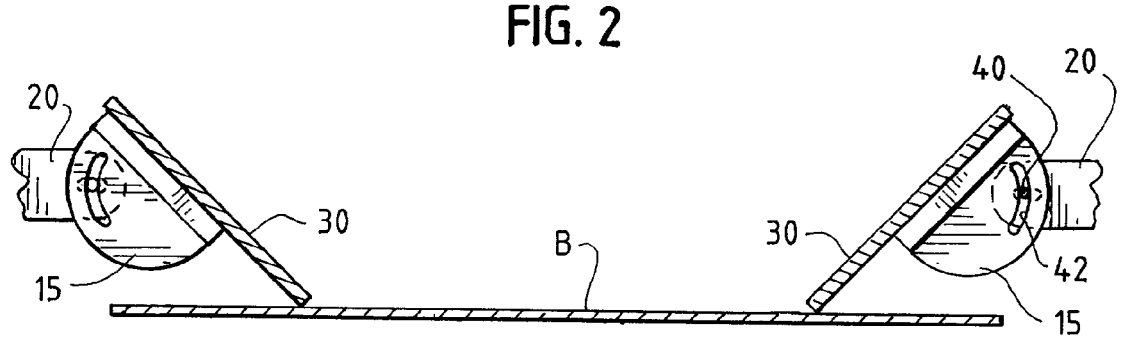
FIG. 2 is a sectional view taken along lines 2—2 of FIG. 1 illustrating the ability of the side rails to move closer together or farther apart, and to pivot about their ends.

Referring to FIG. 2, stainless steel brackets 15 may be bolted to plastic rail 30 to provide the rails with additional support. The side rails may be adjusted width-wise, i.e., they may be brought closer together or farther apart to provide the product sheet with a predetermined width. In a preferred embodiment of FIG. 2, brackets 15 may be slotted to allow them to slide over rigid horizontal bar 20. To fix the side rails in their slidable lengthwise location, convenient mechanical (e.g., thumbscrews) or electronic controls may be provided.

Preferably, and still referring to FIG. 2, slide rails 30 may also be given the ability to be provided in a fixed angular orientation (e.g., to a 45 degree position, as shown) relative to the plane of the casting belt surface. Again, suitable mechanical controls may be provided for this purpose, such as slide 40 on bracket 15, together with a convenient tightening mechanism 42 (which may be a threadably connected fly nut, for example).

Side rails 30 may be constructed from plastic or any other material that is not damaging to the typically stainless steel casting belt.

After extrusion of the molten food product, the extruded sheet 27 may then be further cooled so that it may be cut into ribbons using conventional apparatus such as a ribbon slitting and twisting mechanism (not shown). The ribbons may then be further cut into slices or other forms and packaged. It has been found that for more viscous products, like processed cheese, the use of side rails may be unnecessary.

Instead of a pressure manifold, the present invention could be used when extruding a food product by depositing a puddle of the food product upstream of a rotating roller or a stationary plate located at a fixed height above the casting belt, as disclosed in co-pending U.S. Ser. No. 10/140,773 titled "Casting Apparatus And Process," incorporated herein by reference, filed on the same day as this patent application, and having a common assignee.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

We claim:

1. A casting apparatus for extruding and casting a food product into a sheet having predetermined dimensions, comprising:
   a moving, chilled support surface for the food product;
   means for depositing the food product in molten form onto the moving support surface;
   means for distributing the food product to a predetermined width along the support surface; and
   opposing adjustable side rails adjacent to at least a portion of a longitudinal periphery of the support surface,
   wherein the opposing adjustable side rails extend on the support surface a distance sufficient to allow the food product to retain the predetermined width in the absence of a lateral support, and
   wherein at least one of the opposing adjustable side rails is configured such that an angular orientation of the at least one opposing side rail can be adjusted relative to the plane of the support surface.

2. The casting apparatus of claim 1, wherein opposing adjustable side rails extend on longitudinal periphery of the support surface a distance of at least about 4 feet from the means for distributing.

3. The casting apparatus of claim 2, wherein the opposing adjustable side rails comprise adjustable members having adjustable brackets attached to the side rails, wherein the brackets are slidably engaged to rigid support members, such that a distance between the opposing side rails is adjustable.

4. The casting apparatus of claim 2, wherein the angle between one or both of the side rails and the plane of the support surface is adjustable.

5. The casting apparatus of claim 1, wherein the support surface comprises a casting belt.

6. The casting apparatus of claim 5, wherein the distribution means comprises a pressure manifold.

7. The casting apparatus of claim 6, wherein the pressure manifold comprises a top-cast manifold.

8. The casting apparatus of claim 6, wherein the pressure manifold comprises an angle-cast manifold.

9. The casting apparatus of claim 1, wherein the support surface comprises a surface of a chill roll.

10. The casting apparatus of claim 9, wherein the distribution means comprises a gauge roller and a chill roll.

11. The casting apparatus of claim 1, wherein the casting apparatus is configured for casting a food product that comprises processed cheese.

12. The casting apparatus of claim 1, wherein the casting apparatus is configured for casting a gelatin-based food product.

13. A process for casting a food product into a sheet having a predetermined thickness, comprising the steps of:
   providing a moving support surface;
   depositing the food product over the support surface to a predetermined width; and
   controlling the width of the sheet of the food product using opposing adjustable side rails adjacent at least a portion of a longitudinal periphery of the support surface, wherein the adjustable side rails extend on the longitudinal periphery of the support surface a distance sufficient to allow the food product to retain the predetermined width in the absence of a lateral support, further wherein the adjustable side rails are configured such that their angular orientation relative to the plane of the support surface can be adjusted.

14. The casting process of claim 13, further comprising the step of adjusting the distance between the opposing adjustable side rails.

15. The casting process of claim 13, further comprising the step of adjusting the angle of one or both of the adjustable side rails with the plane of the support surface.

16. The casting process of claim 13, wherein controlling the width of the sheet of the food product using opposing adjustable side rails comprises providing opposing adjustable side rails extending on longitudinal periphery of the support surface a distance of at least about 4 feet from a point of deposition on the support surface.

17. A casting apparatus for extruding and casting a food product into a sheet having predetermined dimensions, comprising:
    a chilled casting belt;
    a manifold configured to distribute a low viscosity food product in a molten form to a predetermined width onto the casting belt; and
    opposing adjustable side rails adjacent each side of the casting belt,
    wherein the opposing adjustable side rails extend along the casting belt a distance sufficient to allow the food product to retain the predetermined width in the absence of a lateral support, and
    wherein at least one of the opposing adjustable side rails is configured such that an angular orientation of the at least one adjustable side rail can be adjusted relative to the plane of the support surface.

18. The casting apparatus of claim 17, wherein the opposing adjustable side rails extend along the casting belt a distance of at least about 4 feet from the manifold.

19. The casting apparatus of claim 17, wherein the adjustable side rails further comprise adjustable brackets attached to the side rails, wherein the bracket are slidably engaged to rigid support members, such that the side rails can be rotated and set at a fixed angular orientation with respect to the plane of the casting belt.

20. The casting apparatus of claim 17, wherein the chilled casting belt comprises an underside cooling surface that is contacted by a cooling fluid, such that the food product is cooled as it travels on the casting belt, and wherein the opposing side rails cooperate with the casting belt to retain the predetermined width of the food product.

* * * * *